United States Patent
Kim et al.

(10) Patent No.: US 12,092,535 B2
(45) Date of Patent: Sep. 17, 2024

(54) STITCHED SENSOR FOR DELETING OR MEASURING ACTING FORCE

(71) Applicant: DEUTSCHE INSTITUTE FÜR TEXTILUND FASERFORSCHUNG DENKENDORF, Denkendorf (DE)

(72) Inventors: Sarah Kim, Calw-Stammheim (DE); Paul Hofmann, Illertissen (DE)

(73) Assignee: DEUTSCHE INSTITUTE FÜR TEXTILUND FASERFORSCHUNG DENKENDORF, Denkendorf (DE)

( * ) Notice: Subject to any disclaimer, the term of this patent is extended or adjusted under 35 U.S.C. 154(b) by 260 days.

(21) Appl. No.: 17/629,903

(22) PCT Filed: Jul. 23, 2020

(86) PCT No.: PCT/EP2020/070768
§ 371 (c)(1),
(2) Date: Jan. 25, 2022

(87) PCT Pub. No.: WO2021/013918
PCT Pub. Date: Jan. 28, 2021

(65) Prior Publication Data
US 2022/0252472 A1    Aug. 11, 2022

(30) Foreign Application Priority Data
Jul. 25, 2019   (DE) .......................... 102019120191.8

(51) Int. Cl.
*G01L 1/18*        (2006.01)
*D02G 3/44*        (2006.01)

(52) U.S. Cl.
CPC ................ *G01L 1/18* (2013.01); *D02G 3/441* (2013.01); *D10B 2401/18* (2013.01); *D10B 2403/02431* (2013.01)

(58) Field of Classification Search
None
See application file for complete search history.

(56) References Cited

U.S. PATENT DOCUMENTS 7,145,432 B2   12/2006  Lussey et al.
7,770,473 B2    8/2010  Von Lilienfeld-Toal et al.
(Continued)

FOREIGN PATENT DOCUMENTS

CN   203719797 U   7/2014
CN   106948065 A   7/2017
(Continued)

OTHER PUBLICATIONS

Bosowski, P. et al. "Design and manugacture of texile-based sensors", Electronic Textiles, Elsevier, 2015, p. 75-107.
(Continued)

*Primary Examiner* — Brandi N Hopkins
*Assistant Examiner* — Nigel H Plumb
(74) *Attorney, Agent, or Firm* — CANTOR COLBURN LLP

(57) ABSTRACT

The disclosure relates to a sensor which is produced by stitching it onto a carrier using threads. The stitching forms a first electrode, a second electrode and a covering layer. The covering layer can be used to produce an electrically conductive connection between the first electrode and the second electrode, at least if a force acts on the covering layer and presses at least one part of the covering layer against a part of the first electrode and of the second electrode. This force can be caused by a pressure locally exerted on the covering layer and/or by bending of the covering layer or of the carrier. The entire sensor and, in particular, the first electrode, the second electrode and the covering layer are produced solely by being stitched onto a common carrier.

(Continued)

The sensor can be produced in a particularly simple and cost-effective manner and is robust.

20 Claims, 9 Drawing Sheets

(56) References Cited

U.S. PATENT DOCUMENTS

| | | | |
|---|---|---|---|
| 8,505,474 B2 | 8/2013 | Kang et al. | |
| 8,661,915 B2 | 3/2014 | Taylor | |
| 8,701,578 B2 | 4/2014 | Chung et al. | |
| 8,904,876 B2 | 12/2014 | Taylor et al. | |
| 9,816,799 B2 | 11/2017 | Keller et al. | |
| 2003/0119391 A1* | 6/2003 | Swallow | G01L 1/20 442/6 |
| 2004/0173028 A1 | 9/2004 | Rix | |
| 2008/0307899 A1* | 12/2008 | Von Lilienfeld-Toal | G01L 1/205 73/862.68 |
| 2016/0048235 A1 | 2/2016 | Poupyrev | |
| 2016/0328043 A1 | 11/2016 | Moller et al. | |
| 2017/0261388 A1 | 9/2017 | Ma et al. | |
| 2019/0024269 A1* | 1/2019 | Horter | G01L 5/228 |

FOREIGN PATENT DOCUMENTS

| | | |
|---|---|---|
| DE | 102013001772 A1 | 7/2014 |
| GB | 2343516 A | 5/2000 |

OTHER PUBLICATIONS

Gries, T. et al. "Füge-und Oberflächentechnologien für Textilien: Verfahren und Anwendungen", Springer-Verlag, 2007.

Hasani, M et al. "Implementation of a dual-interrogation-mode embroidered RFID-enabled strain sensor", IEEE Antennas and Wireless Propagation Letters 12, p. 1272-1275, 2013.

International Search Report for International Application No. PCT/EP2020/070768; Date of Completion: Oct. 30, 2020; Date of Mailing: Nov. 10, 2020; 5 Pages.

Koo, H. et al. "The effect of textile-based inductive coil sensor positions for heart rate monitoring", Journal of medical systems 38 (2), p. 2, 2014.

Linz, T. et al. "Contactless EMG sensors embroidered onto textile", 4th International Workshop on Wearable and Implantable Body Sensor Networks, Berlin, Heidelberg, Springer, 2007, p. 29-34.

Mecnika, V. et al. "Joining technologies for electronic textiles", Electronic Textiles, Elsevier, 2015, p. 133-153.

Mecnika, V. et al. "Preliminary Study on Textile Humidity Sensors", Smart SysTech 2015; European Conference on Smart Objects, Systems and Technologies; Proceedings of. VDE9, p. 1-9, 2015.

Meyer, J. et al. "Design and Modeling of a Textile Pressure Sensor for Sitting Posture Classification", IEEE Sensors Journal 10 (8), p. 1391-1398, 2010.

Meyer, J. et al. "Textile Pressure Sensor for Muscle Activity and Motion Detection", Wearable Computers, 10th IEEE International Symposium, p. 69-72, 2006.

Translation for International Search Report for International Application No. PCT/EP2020/070768; Date of Completion: Oct. 30, 2020; Date of Mailing: Nov. 10, 2020; 3 Pages.

Written Opinion for International Application No. PCT/EP2020/070768; International Filing Date: Jul. 23, 2020; Date of Mailing: Nov. 10, 2020; 6 Pages.

Zhang, L. et al. "Embroidered textiles for RF electronics and medical sensors", Wireless Information Technology and Systems (ICWITS), 2012 IEEE International Conference, p. 1-4, 2012.

JPO Notice of Reasons for Rejection corresponding to JP Application No. 2022-504287; Issue Date, Jul. 2, 2024.

* cited by examiner

STITCHED SENSOR FOR DELETING OR MEASURING ACTING FORCE

CROSS REFERENCE TO RELATED APPLICATIONS

This application is a National Stage of PCT Application No. PCT/EP2020/070768 filed on Jul. 23, 2020, which claims priority to German Patent Application No. 10 2019 120 191.8 filed on Jul. 25, 2019, the contents each of which are incorporated herein by reference thereto.

TECHNICAL FIELD

The invention refers to a sensor that is configured to detect and/or measure a force acting on the sensor. The sensor operates preferably piezo-resistive. The sensor can observe or measure an effective pressure force or bending force. It is particularly arranged on a flexible carrier that can be made of a textile material, for example. For example, a woven textile material and/or a knitted textile material and/or a warp-knitted textile material and/or a fleece material can be used as textile material.

BACKGROUND

US 2016/0328043 A1 describes a sensor in which a conductive pattern is stitched on a flexible carrier. The sensor is configured as capacitive sensor. In an embodiment the conductive pattern comprises conductive node points. A cover layer comprises conductive counter-contacts. Between the cover layer and the carrier an intermediate layer is present adjacent to the conductive nodes and the counter-contacts in order to provide a distance between a node and the opposite counter-contact as long as no force acts on the cover layer. During pressing the cover layer, the counter-contact gets in contact with the node and can provide an electrical connection. In such an arrangement a keyboard can be formed, for example.

U.S. Pat. No. 9,816,799 B2 discloses a deformation sensor having an electrically conductive element that is applied on a textile carrier or integrated into a textile carrier. Deformations of the textile carrier can be recognized, because the distance of sections of the electrically conductive element changes. The electrically conductive element can be arranged in a meander shape, for example. Alternatively, also two electrically conductive elements can be provided in an interdigital arrangement.

US 2017/0261388 A1 describes a pressure sensor of interdigital electrodes that are printed on a carrier. The printing of electrodes is not readily possible on all types of carriers. Depending on the configuration and the material of the carrier, faults can occur during printing of the electrodes due to capillary effects, e.g. in the case of textile carriers.

U.S. Pat. No. 8,701,578 B2 describes a clothing item in which knitting patterns are applied for establishing an electrically conductive communication path. Sensors can be connected to these knitted communication paths.

Interactive textiles are described in US 2016/0048235 A1. It is a woven fabric with conductive threads, wherein a multi-layer configuration is proposed for formation of a capacitive pressure sensor.

U.S. Pat. No. 7,770,473 B2 discloses a pressure sensor made of a multi-layer yarn with conductive fibers and a pressure sensitive layer. Such a multi-layer yarn can be introduced in a knitted fabric as filler yarn. The pressure sensor is thereby formed by the multi-layer yarn itself.

A method for manufacturing of a conductive yarn is known from U.S. Pat. No. 8,505,474 B2. Thereby metallic fibers are coated with non-conductive filaments.

Another known principle for manufacturing a sensor is the formation of a sandwich structure of multiple separate layers. Such sensors are, e.g. known from U.S. Pat. No. 7,145,432 B2 or U.S. Pat. No. 8,661,915 B2 or U.S. Pat. No. 8,904,876 B2.

Moreover, US 2004/0173028 A1 as well as DE 10 2013 001 772 A1 disclose the possibility to integrate pressure sensors in surfaces in a vehicle.

The company Interlink Electronics offers under the name FFR® a touch sensor having a variable resistance. It consists of multiple polymer layers that are connected by laminating. A polymer layer is coated with interdigital electrodes, while the other polymer layer is coated with a special semi-conductor material. Due to pressure application, electrodes can be connected in parallel via the semi-conductor material.

Further background information for textile-based sensors can be taken from specialized literature:

BOSOWSKI, P., et al., "Design and manufacture of textile-based sensors", *Electronic Textiles*, Elsevier, 2015, p. 75-107.

MEYER, Jan; LUKOWICZ, Paul; TROSTER, Gerhard, "Textile pressure sensor for muscle activity and motion detection", *Wearable Computers, 10th IEEE International Symposium*, p. 69-72, 2006.

MEYER, Jan, et al., "Design and modeling of a textile pressure sensor for sitting posture classification", *IEEE Sensors Journal* 10 (8), p. 1391-1398, 2010.

LINZ, Torsten; GOURMELON, Lena; LANGEREIS, Geert, "Contactless EMG sensors embroidered onto textile", *4th International Workshop on Wearable and Implantable Body Sensor Networks*, Berlin, Heidelberg, Springer, 2007, p. 29-34.

MECNIKA, V., et al., "Joining technologies for electronic textiles", *Electronic Textiles*, Elsevier, 2015, p. 133-153.

HASANI, M., et al., "Implementation of a dual-interrogation-mode embroidered RFID-enabled strain sensor", *IEEE Antennas and Wireless Propagation Letters* 12, p. 1272-1275, 2013.

ZHANG, Lanlin, et al., "Embroidered textiles for RF electronics and medical sensors", *Wireless Information Technology and Systems (ICWITS), 2012 IEEE International Conference*, p. 1-4, 2012.

KOO, Hye Ran, et al., "The effect of textile-based inductive coil sensor positions for heart rate monitoring", *Journal of medical systems* 38 (2), p. 2, 2014.

MECNIKA, Viktorija, et al., "Preliminary Study on Textile Humidity Sensors", *Smart SysTech 2015; European Conference on Smart Objects, Systems and Technologies; Proceedings of. VDE*9, p. 1-9, 2015.

GRIES, Thomas; KLOPP, Kai (Hg.), "Joining and Surface Technologies for Textiles: Methods and Applications", original title: ["Füge-und Oberflächentechnologien für Textilien: Verfahren und Anwendungen"], Springer-Verlag, 2007.

BRIEF SUMMARY

Starting from the known prior art it is an object of the present invention to provide a sensor for detection of a pressure force and/or a bending force that can be realized with simple means in a cost-effective manner.

A sensor configured to detect and/or measure a force applied on the sensor, wherein the sensor includes: a carrier; a first electrode that is formed by at least one first thread that is stitched on the carrier and that comprises electrically conductive components; a second electrode that is formed by at least one second thread that is stitched on the carrier and that comprises electrically conductive components, wherein the first electrode and the second electrode are arranged with distance to one another on the carrier; and a cover layer that is formed by at least one third thread that is stitched on the carrier and that comprises electrically conductive components, wherein the at least one third thread of the cover layer is in abutment with the at least one first thread of first electrode and the at least one second thread of second electrode at multiple contact sites.

The sensor according to the invention is configured to detect and/or measure a force acting on the sensor. In the simplest case, a digital detection of the applied force can be carried out. In an embodiment of the sensor a sensor value depending on the amount of the applied force, particularly an electrical sensor value, can be created by means of the sensor. Preferably the sensor operates piezo-resistive for this purpose. For example, the sensor can be used as pressure sensor or bending sensor.

The sensor comprises a carrier. The carrier consists preferably of a flexible material. The carrier is a flat element that is substantially two-dimensionally or 2.5-dimensionally configured. This means a flat element having a thickness that is at least one order of magnitude smaller than the length and the width in a plane in which the carrier extends. For example, a textile material can be used as carrier, such as a woven fabric, a knitted fabric, a warp-knitted fabric or a fleece material or an arbitrary combination thereof. The carrier or carrier material has preferably a one layer configuration.

A first electrode and a second electrode are formed on the carrier by stitching. The electrodes are not only attached on the carrier by means of stitching, but are formed by means of the stitched thread on the carrier. A first electrode is formed by stitching of at least one first thread on the carrier and a second electrode is formed by stitching of at least one second thread on the carrier. The at least one first thread and the at least one second thread comprise electrically conductive components or are made of such electrically conductive components. Such components can be fibers and/or at least one filament and/or a filler and/or a coating. The at least one first thread and the at least one second thread can be configured as yarn or twisted yarn, wherein twisted yarn is preferred due to the better stitchability.

The two electrodes are arranged with distance to one another on the carrier, such that the at least one first thread and the at least one second thread are not arranged on the carrier having direct contact to one another. The electrodes formed by stitching are preferably arranged on a common side of the carrier and are located preferably in a common layer directly on the respective side of the carrier. Depending on whether the carrier is orientated in one plane or is curved or bent, the first and/or second electrode can also extend in a planar or curved or bent manner along the surface of the carrier.

The stitched sensor has in addition a cover layer that is formed by at least one third thread stitched on the carrier. As in the case of the electrodes, the cover layer is not configured as separate element that is attached by means of stitching on the carrier, but is formed by stitching with the at least one third thread. The at least one third thread comprises electrically conductive components. The at least one third thread can be formed by a yarn or preferably a twisted yarn. At multiple contact sites it is in abutment with the at least one thread of the first electrode and the at least one second thread of the second electrode. Preferably a section of the at least one first thread or second thread is arranged at each contact site between the section of the at least one third thread and the carrier.

Depending on a force acting on the cover layer that can be created by pressure or bending, the electrical conductivity between the first electrode and the second electrode of the sensor changes. In doing so, an applied force can be recognized and/or measured.

The entire sensor can thus be manufactured by stitching. Stitching is a method that can be carried out without costly production means using a sewing machine or a stitching machine. By stitching of the threads on the carrier the two electrodes as well as a cover layer is created and a sensor is manufactured. The electrodes and the cover layer that are manufactured during stitching can be applied onto many different carrier materials and also on carrier materials that are not suitable for printing due to their capillary effect. The manufacturing of multiple sensor plies or sensor layers and the subsequent connection of these sensor plies or sensor layers is not necessary. The sensor can be manufactured in a continuous process in a single sewing machine or stitching machine. It is potentially only expedient for the stitching of the electrodes and the cover layer to use different threads. In stitching machines having multiple heads, such a thread change can be carried out very quickly and simply.

Preferably, at least not all of the threads and particularly not the at least one first thread for forming the first electrode and not the at least one second thread for forming the second electrode have an own sensor characteristic. According to the invention, the sensor function is achieved by cooperation of the threads of the electrodes and the cover layer and not by one of the threads.

Preferably, the at least one third thread has an electrical conductivity that is different from the electrical conductivity of the at least one first thread and/or the at least one second thread. Particularly, the at least one third thread has an electrical conductivity that is lower than the electrical conductivity of the at least one first thread and/or the at least one second thread. The at least one first thread and the at least one second thread can have equal electrical conductivities and can be particularly identical.

The at least one first thread and/or the at least one second thread and/or the at least one third thread can comprise electrically conductive fibers and/or fillers and/or at least one electrically conductive filament and/or an electrically conductive coating. As electrically conductive material for the fibers or fillers or filaments or coatings, silver, stainless steel, carbon or carbon black or other known materials or combinations thereof can be used.

In an embodiment the sensor comprises a total resistance between a first connection of the first electrode and a second connection of the second electrode, the amount of which depends from a force acting on the cover layer. The force can be effected by pressure or bending of the carrier or sensor. Thereby the total resistance can depend on the first contact resistance between the at least one first thread of the first electrode and the at least one third thread of the cover layer and on a second contact resistance between the at least one second thread of the second electrode and the at least one third thread of the cover layer. In addition, the total resistance can also depend on a flow resistance of the at least one third thread, the amount of which can depend on the applied force and the deformation of the at least one third thread resulting therefrom. Thus, the total resistance can be defined by at least one series connection of a first contact resistance, a second contact resistance and an—potentially variable— flow resistance. Also multiple of such series connections can be connected parallel to each other that then define the total resistance between the first connection and the second connection. For example, this depends on how large the location is where the force is applied and how many contact locations are influenced by the application of the force.

In a preferred embodiment the first electrode has a first base zone and multiple first electrode fingers projecting from the first base zone. Between two directly adjacent first electrode fingers one first interstice is formed respectively. Analog to this the second electrode can have a second base zone and multiple second electrode fingers projecting from the second base zone. Between two directly adjacent second electrode fingers a second interstice is formed respectively.

In one embodiment multiple first threads for stitching the first electrode and/or multiple second threads for stitching the second electrode can be used. In doing so, different areas of the first electrode or second electrode can be manufactured or stitched from different materials. For example, the base zone can be stitched from a thread material, different from the electrode fingers of the first electrode and/or second electrode. For example, this configuration can be of particular advantage, if the sensor is configured in the type of a potentiometer.

The first electrode fingers are preferably orientated parallel to one another. The second electrode fingers are preferably orientated parallel to one another. It is further advantageous, if the first electrode fingers and the second electrode fingers extend parallel to each other. Thereby at least one second electrode finger can extend into a first interstice and at least one first electrode finger can extend into a second interstice. An interdigital arrangement of the two electrodes is achieved, so to speak. Preferably the distance between the first electrode fingers and the respectively adjacent second electrode fingers is equal. It is advantageous, if the electrode fingers are arranged with uniform distances.

Instead of the interdigital arrangement of the electrodes, the electrodes can also have another shape. For example, the electrode fingers and/or the base zones can comprise at least one location of curvature and/or at least one bending location. The base zones can be line-shaped (the width can be less than the length, e.g. at least about the factor 5-10) or can also surround or fill an area, e.g. a circular or polygonal area.

In one embodiment the first electrode and the second electrode can extend substantially parallel to one another at least in a region in which the cover layer covers the two electrodes. In this region the two electrodes can be arranged with approximately constant distance next to each other. The electrodes can comprise one or multiple curvatures and/or bending locations and/or corners in this region. For example, the two electrodes can extend in a meandering manner, at least in this region. Also multiple of such regions can be present that are arranged spatially separated from one another on the carrier. In this one or these multiple regions each electrode can extend without branching location. Between respectively two of such regions, branching locations can be present. By means of one or multiple of such regions, shapes, symbols, letters or the like can be formed, for example.

In such a configuration sections of the first electrode and/or second electrode can extend directly adjacent and parallel to one another, while in an interdigital arrangement preferably electrode fingers of different electrodes are arranged directly adjacent to each other respectively.

At least some of the first interstices and the second interstices are preferably dimensioned such that sufficient space for puncture sites of the at least one third thread of the cover layer remains. Multiple puncture sites of the stitched cover layer where the at least one third thread punctures the carrier are preferably arranged in the first or second interstices adjacent to the electrode fingers. The puncture sites of the at least one third thread do not penetrate the at least one first thread of the first electrode nor the at least one second thread of the second electrode.

The at least one third thread of the cover layer comprises multiple stitches having at least one contact site respectively that can be denoted as bridging stitches. Each bridging stitch has preferably a contact site to the at least one first thread and a contact site to the at least one second thread.

In an embodiment each bridging stitch can extend over one of the first electrode fingers and one of the second electrode fingers respectively. Preferably a bridging stitch extends over exactly one first electrode finger and exactly one second electrode finger. The bridging stitch extends between two puncture sites that are arranged on opposite sides of the electrode fingers arranged underneath.

In an embodiment the bridging stitches that extend over one specific or considered first electrode finger only extend over one of the directly adjacently arranged second electrode fingers respectively. In doing so, a bridging stitch group of bridging stitches can be formed, the puncture sites thereof are arranged on two lines extending parallel to each other, wherein these lines are orientated parallel to the associated first electrode finger and the associated second electrode finger. In an alternative embodiment contact with two directly adjacent second electrode fingers is established via the bridging stitches that extend over one specific or considered first electrode finger. For this some of these bridging stitches extend over the first electrode finger and the one second electrode finger and some of the other bridging stitches extend over the first electrode finger and the other second electrode finger. The bridging stitches are arranged offset to one another in a direction orthogonal to the extension direction of the electrode fingers and overlap in the area in which the first electrode finger extends.

The arrangement of the bridging stitches that has been described in connection with one considered first electrode finger can be provided accordingly for a considered second electrode finger.

It is in addition preferred, if the at least one third thread of the cover layer extends over the at least one third thread and the at least one second thread exclusively at the electrode fingers. Thus, the third thread does not extend over the first electrode and the second electrode in the region of the first base zone or the second base zone.

In an embodiment the sensor can be configured as potentiometer. Thereby it is particularly advantageous, if the first base zone of the first electrode or the second base zone of the second electrode forms a resistance zone. The resistance along the resistance zone can increase in an extension direction of the resistance zone starting and away from a respective connection of the electrode. The resistance between an electrode finger and the connection may be the higher due to the increasing resistance of the resistance zone, the further the electrode finger is distanced from the respective connection. In doing so, the total resistance of the sensor between the first connection of the first electrode and the second connection of the second electrode can vary depending on the location where the conductive or better conductive connection is established between the two electrodes due to the application of force.

In all of the embodiments in addition to the first electrode and the second electrode at least one distance element can be provided on the carrier that is arranged between the carrier and the cover layer. The distance element is located on the carrier adjacent to the first electrode and the second electrode, e.g. in an interstice between the two electrodes. By means of the at least one distance element, the distance between the cover layer and the carrier or between the cover layer on one hand and the first electrode and the second electrode on the other hand, can be defined for an initial condition in which no external force acts on the cover layer. By means of the at least one distance element, for example, the content between the cover layer and the first electrode and/or the second electrode in the initial condition can be prevented or degraded.

In a preferred embodiment the at least one distance element can be formed by at least one distance thread. The at least one distance thread can be sewn or stitched on the carrier.

The distance thread is arranged at least in the area between or adjacent to the electrodes in which the cover layer is present. The distance thread is located there between the cover layer and the carrier. The distance thread can be arranged in at least one first interstice and/or at least one second interstice, for example. The distance thread is preferably electrically non-conductive. The thickness or strength of the distance thread is preferably larger than the thickness or strength of the at least one first thread and the at least one second thread. By means of the distance thread the contact between the at least one third thread and the at least one second thread or between the at least one third thread and the at least one first thread can be reduced in the initial condition without application or force on the sensor.

By means of one or multiple of the above embodiments of the invention, a very flat configured sensor is obtained. The material usage for manufacturing of the sensor is low and only little waste is created during manufacturing. The measurement range and/or the measurement sensitivity can be defined by one or more of the following characteristics:

- The selection of the thread or yarn or twisted yarn for the first thread and/or the second thread and/or the third thread;
- The arrangement of electrodes and/or the bridging stitches of the cover layer;
- The arrangement of the bridging stitches of the cover layer;
- The integration of the additional distance thread.

The sensor according to the invention can also be manufactured with one or more additionally stitched sensors in a common process on a sewing machine or stitching machine, e.g. together with a further sensor according to the invention or with a humidity sensor. The sensor according to the invention can be combined during stitching also with other stitched electrical function areas, such as supply lines and/or heating devices.

BRIEF DESCRIPTION OF THE DRAWINGS

Advantageous embodiments of the invention are derived from the dependent claims, the description and the drawings. Preferred embodiments of the invention are explained in detail in the following based on the drawings. The drawings show:

DETAILED DESCRIPTION

Figure 1:
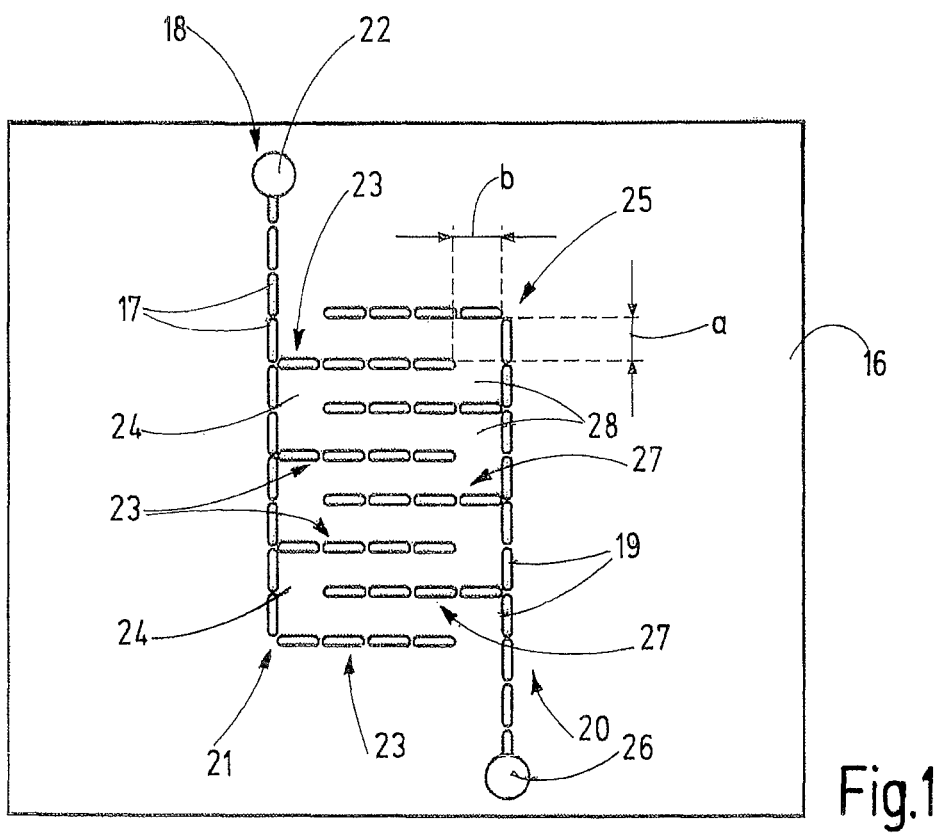
FIG. 1 a schematic view of a carrier, a first electrode formed by a first thread and a second electrode formed by a second thread, FIG. 2 a schematic illustration of the sensor having a carrier and the electrodes of FIG. 1 as well as a cover layer of a third thread that is in contact with the first electrode and the second electrode, FIGS. 3 and 4 a schematic view of further embodiments of the sensor according to FIG. 2 respectively, wherein the stitches of the cover layer are arranged different as the embodiment according to FIG. 2, FIG. 5 a schematic basic illustration of a bridging stitch of the third thread of the cover layer that extends over a first thread of the first electrode and a second thread of the second electrode, FIG. 6 the illustration of FIG. 5 during a pressure application onto the third thread, FIG. 7 an electrical equivalent circuit of a total resistance of a bridging stitch of the at least one third thread that varies depending on the application of a force, FIG. 8 a schematic illustration of a carrier on which a first electrode and a second electrode are stitched, wherein a distance thread is stitched or sewn on the carrier between the two electrodes, FIG. 9 a schematic basic illustration of a bridging stitch of the third thread, as well as a first thread, a second thread and a distance thread in the embodiment according to FIG. 8, FIG. 10 a schematic basic illustration of a potentiometer formed by the sensor, FIG. 11 an equivalent circuit of the potentiometer illustrated in FIG. 10, FIG. 12 a schematic view of a carrier of a first electrode formed by a first thread and a second electrode formed by a second thread and FIG. 13 a schematic illustration of a further embodiment of a sensor having the carrier and the electrodes of FIG. 12 as well as a cover layer of a third thread that is in contact with the first electrode and the second electrode.

The invention refers to a sensor 15 that can be manufactured by stitching. In FIGS. 2-4, 8 and 10 different embodiments of a sensor 15 are schematically illustrated respectively. The sensor 15 is configured to detect or measure a force F (FIG. 6) acting on the sensor 15. Thereby either only the presence of an external force application can be detected or determined or as an option, in addition a sensor value can be created that depends on the amount of the applied force and/or on the location where the force F is applied.

The sensor 15 can be denoted as stitched sensor 15. It comprises a carrier 16 that is preferably configured as textile carrier 16. The carrier 16 is in general a two-dimensional structure and thus has in an extension plane a length and a width that are about one or multiple orders of magnitude larger than a thickness of the carrier 16 orthogonal to its extension plane. The carrier 16 can be made of plastic material and/or natural material. Preferably the carrier 16 is configured as textile carrier, e.g. as knitted fabric and/or warp knitted fabric and/or woven fabric and/or fleece material. The carrier 16 can be part of a clothing item or another textile surface.

By using at least one first thread 17, a first electrode 18 is produced by stitching on the carrier 16. In the figures the individual stitches are schematically illustrated with view on one side of the carrier 16 that can be created by means of the first thread 17 on the carrier 16. The at least one first thread 17 comprises electrically conductive components such as electrically conductive fibers, filaments or fillers. As electrically conductive material silver, stainless steel or carbon or a combination thereof can be used. The at least one first thread 17 can also comprise an electrically conductive coating.

By using at least one second thread 19, a second electrode 20 is produced by stitching on the carrier 16 and according to the example, on the same side of the carrier 16. The at least one second thread 19 comprises electrically conductive components and can be configured, as it has been explained above with regard to the first thread 17. The at least one first thread 17 and the at least one second thread 19 have preferably equal electrical conductivities and can be identical.

As particularly illustrated in FIG. 1, first electrode 18 and second electrode 20 are arranged in an interdigital manner in some embodiments (FIGS. 1-4, 8, 10). For this first electrode 18 comprises a first base zone 21 that extends away originating from a first connection 22, e.g. in a straight manner. Transverse and preferably orthogonal to the first base zone 21, multiple first electrode fingers 23 project. The first electrode fingers 23 are arranged with uniform distances parallel to one another. Between two directly adjacent first electrode fingers 23 a first interstice 24 is formed. The number of the first electrode fingers 23 and thus the number of the first interstices 24 can vary depending on the realized dimension of the sensor. Also the length of the base zone 21 or the length of the first electrode fingers 23 may vary. In the embodiment all of the first electrode fingers 23 have equal lengths.

The second electrode that is manufactured of the at least one second thread 19 is configured analogously to the first electrode 18. It comprises a second base zone 25 that extends away originating from a second connection 26, e.g. in a straight manner. The first base zone 21 and the second base zone 25 extend preferably parallel to one another and are arranged with distance to one another. Multiple second electrode fingers 27 project transverse and preferably orthogonal from the second base zone 25. The second electrode fingers 27 are parallel to each other and arranged in uniform distances to one another in the embodiment. They have preferably equal lengths. Between two directly adjacent second electrode fingers a second interstice 28 is formed respectively.

For stitching the base zones 21, 25 and the stitching of the electrode fingers 23, 27, threads of different materials can be used. For example, the first electrode 18 can be stitched from two different (particularly different conductive) first threads and the second electrode 20 can be stitched from two different (particularly different conductive) second threads.

In the embodiment the first electrode fingers 23 and the second electrode fingers 27 are arranged parallel to each other. In one, multiple or all first interstices 24 at least one and according to the example, exactly one second electrode finger 27 extends. In one, multiple or all second interstices 28 at least one and according to the example, exactly one first electrode finger 23 extends. In a direction parallel to the extension of the first base zone 21 and the second base zone 25, thus, first electrode fingers 23 and second electrode fingers 27 are always arranged alternatingly.

Between the first electrode 18 and the second electrode 20 a distance is provided, such that the at least one first thread 17 and the at least one second thread 19 do not directly contact each other. In the embodiment between each first electrode finger 23 and a directly adjacent second electrode finger 27, a first distance a is provided with view parallel to the extension direction of the base zones 21, 25. With view parallel to the extension direction of the electrode fingers 23, 27 a second distance b is provided between the free end of the first electrode finger 23 and the second base zone 25. Accordingly, the same second distance b can be provided toward the free end of the second electrode fingers 27. In an embodiment the first distance a and the second distance b have equal amounts.

As already explained, no direct contact and no direct electrically conductive connection exists between the first electrode 18 and the second electrode 20. The carrier 16 is at least in this area in which the electrodes 18, 20 are arranged thereon, electrically non-conductive or at least not configured such that it establishes an indirect electrical contact between the two electrodes.

An indirect contact and an indirect electrically conductive connection between the first electrode 18 and the second electrode 20 can be established via a cover layer 32. The cover layer 32 is formed in that at least one third thread 33 is stitched on the carrier 16. Analog to the at least one first thread and the at least one second thread, the at least one third thread comprises electrically conductive components and can comprise a configuration, as it has been initially described in connection with the first thread 17. Preferably the at least one third thread 33 is different from the at least one first thread 17 and the at least one second thread 19. Particularly the electrical conductivity of the at least one third thread 33 is different from the electrical conductivity of the threads 17, 19 of electrodes 18, 20. According to the example, the electrical conductivity of the at least one third thread 33—at least in a condition in which no external force is applied on the at least one third thread 33—lower than the electrical conductivity of the first thread 17 and the second thread 19. In an embodiment the at least one third thread 33 has electrically conductive components, such as fillers and/or fibers and/or filaments, the distance of which changes upon an external influence, whereby the conductivity of the at least one third thread 33 is changed and preferably increases.

The at least one third thread 33 extends over the first electrode 18 and the second electrode 20 at multiple positions and thus forms multiple first contact sites 34 with the at least one first thread 17 and multiple second contact sites 35 with the at least one second thread 19. Each first contact site 34 has a first contact resistance R1 between the first thread 17 and the third thread 33 and each second contact site 35 has a second contact resistance R2 between the second thread 19 and the third thread 33. The at least one third thread 33 may have a variable flow resistance R3.

Figure 5:
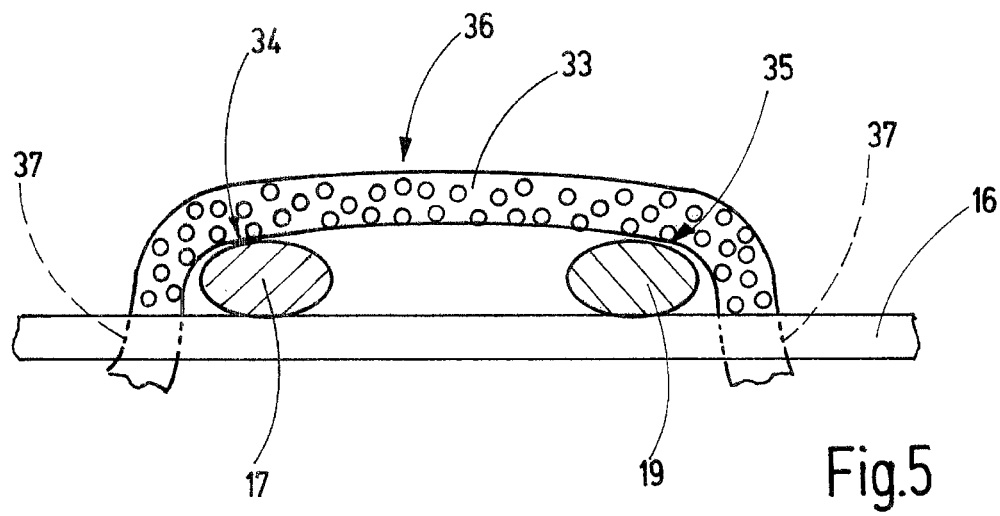
Figure 6:
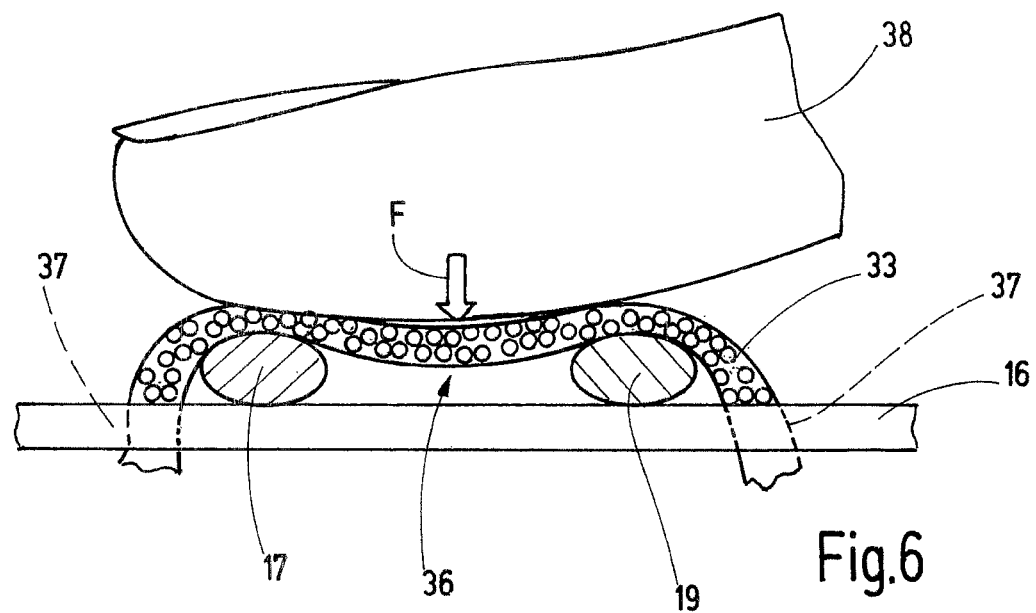
Figure 7:
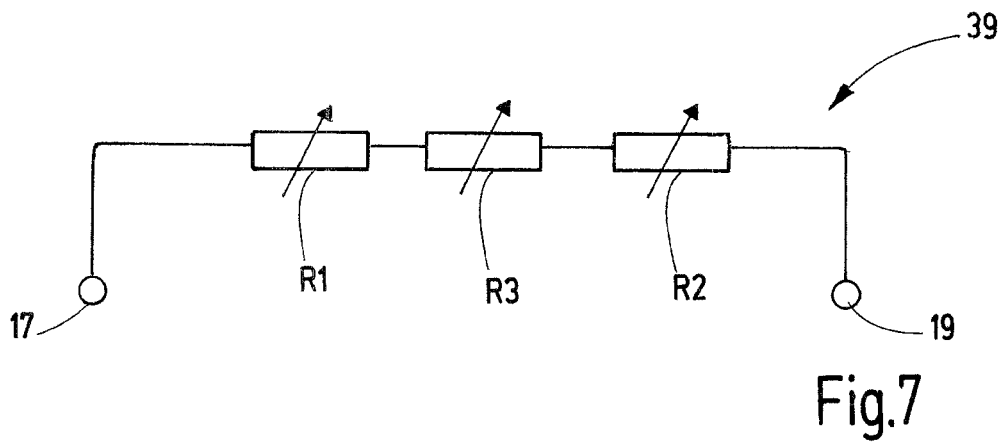

As schematically illustrated based on FIGS. 5-7, a contact between the at least one third thread 33 and the at least one first thread 17 or the at least one second thread 19 can be improved such that the first contact resistance R1 and the second contact resistance R2 become lower upon application of a force F on the cover layer 32. As an option, in addition the flow resistance R3 of third thread 33 can be lowered due to the force application, e.g. in that electrically conductive components of third thread 33 establish an improved electrical connection along the extension direction of third thread 33 amongst each other due to the applied force F, whereby its conductivity is increased or its flow resistance R3 between a first contact site 34 and a directly adjacent second contact site 35 is lowered.

Figure 2:
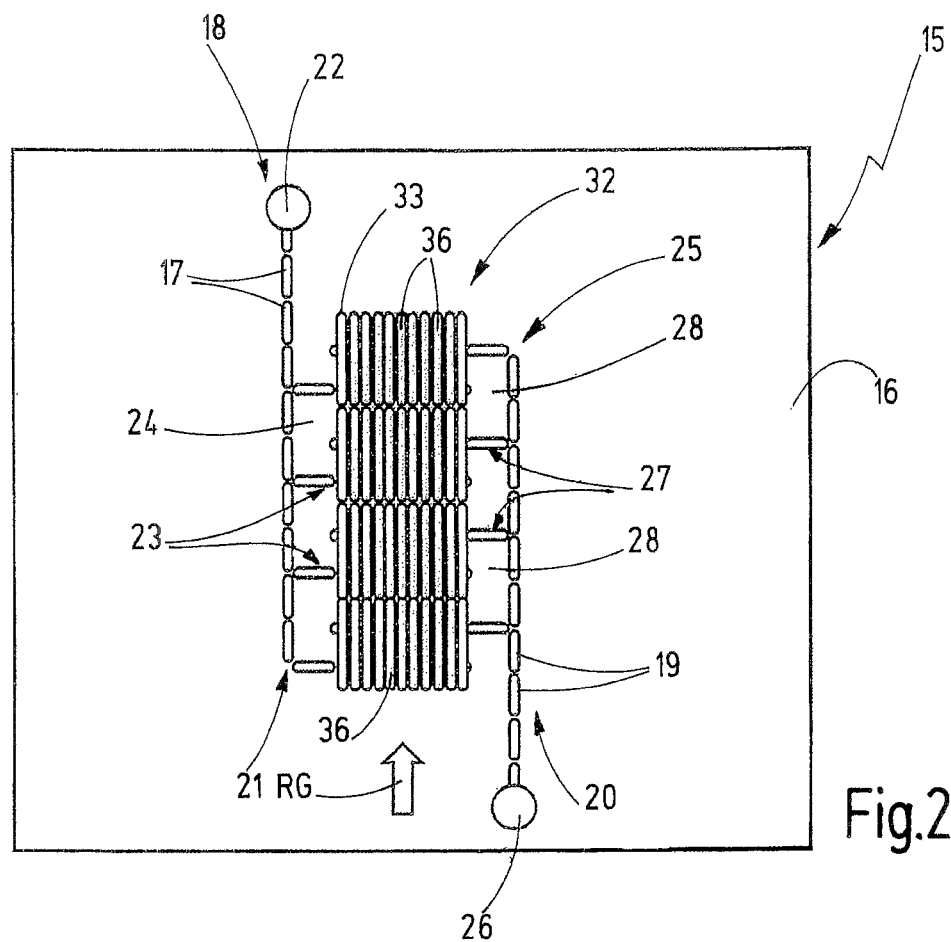
Figure 3:
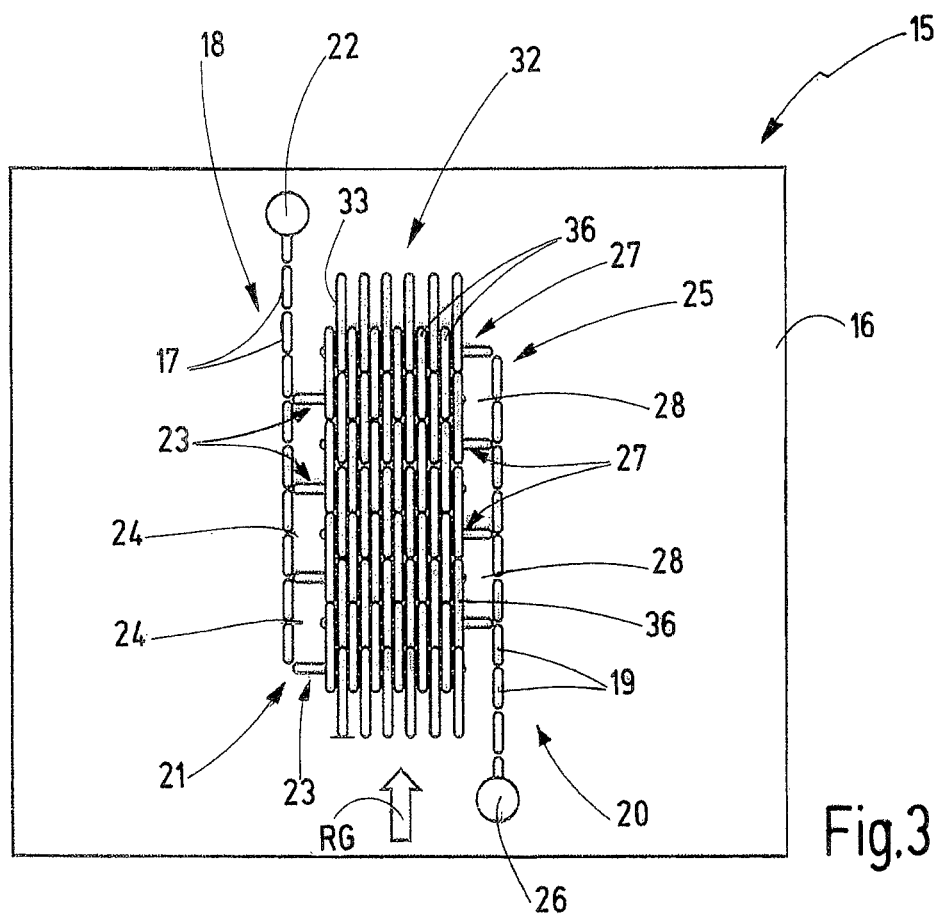
Figure 4:
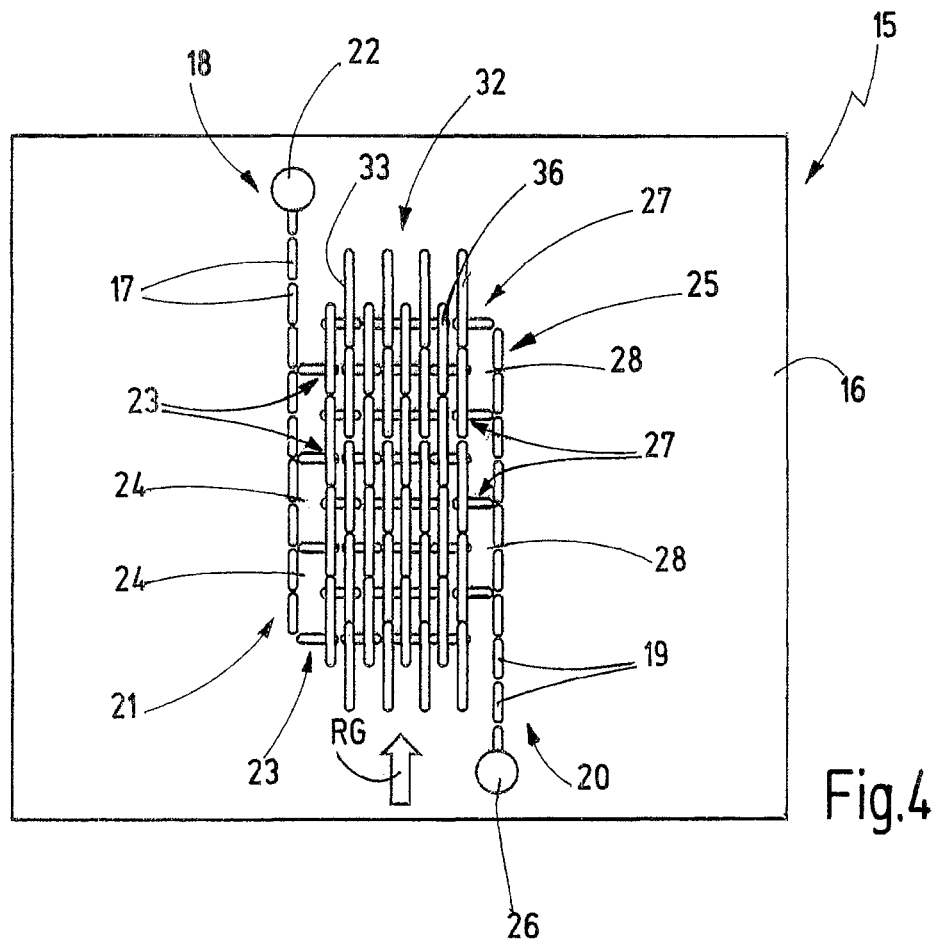

As schematically illustrated in FIGS. 2-4, the at least one third thread 33 of cover layer 32 forms multiple stitches due to the stitching on the carrier 16 that can be denoted as bridging stitches 36 that comprise a first contact site 34 and a second contact site 35 in each case and that extend over a first electrode finger 23 and a directly adjacent second electrode finger 27 respectively in the embodiment. It is preferred, if each bridging stitch 36 extends over exactly one first electrode finger 23 and exactly one second electrode finger 27. In doing so, a bridging stitch 36 can be kept very short between its two puncture sites 37.

A bridging stitch 36 between two puncture sites 37 is schematically illustrated in FIGS. 5 and 6. FIGS. 2-4 show different stitch patterns that can be used for arranging the bridging stitches 36 of cover layer 32. In the embodiment shown in FIG. 2 exactly one second electrode finger 27 is assigned to each first electrode finger 23 that form a common electrode finger pair. An electrode finger pair 23, 27 is bridged by one bridging stitch group of multiple bridging stitches 36. Bridging stitches 36 that connect electrode fingers of different electrode finger pairs with each other are not present. For example, bridging stitches 36 that are assigned to a common electrode finger pair 23, 27 are arranged such that the puncture sites 37 are orientated along two parallel lines, wherein these lines extend parallel to the electrode fingers 23, 27 of the electrode finger pair. The bridging stitches 36 thus form one bridging stitch group for each electrode finger pair respectively, wherein the bridging stitch groups do not overlap in a direction parallel to the extension direction of the base zones 21, 25 and adjoin one another either with contact or with distance.

In FIGS. 3 and 4 an alternative embodiment is shown. The bridging stitches 36 are arranged offset to one another parallel to the extension direction of the base zones 21, 25. In doing so, the first electrode finger 23 that extends into a second interstice 28, is coupled by means of multiple bridging stitches 36 with one directly adjacent second electrode finger 27 and by multiple other bridging stitches 36 with the respective other directly adjacent second electrode finger 27. In doing so the electrical connection between first electrode 18 and the second electrode 20 via cover layer 32 can be improved at least during application of a force.

The stich density of bridging stiches 36 can vary.

The difference between the embodiment according to FIG. 3 and the embodiment according to FIG. 4 is that in the embodiment according to FIG. 3 bridging stitches 36 that are arranged in one row or line orthogonal to the extension direction of the base zones 21, 25 adjoin substantially without distance to one another, while the bridging stitches 36 in this direction have a distance to one another in the embodiment according to FIG. 4.

Apart from the arrangement of the bridging stitches 36, the embodiments according to FIGS. 2 and 4 are identically configured.

In the preferred embodiment illustrated here, each bridging stitch 36 comprises at least one puncture site 37 that is located in a first interstice 24 and in a second interstice 28. All puncture sites 37 are arranged adjacent to the respective electrode fingers 23, 27 and neither penetrate the at least one first thread 17 nor the at least one second thread 19.

The cover layer 32 is in some embodiments (FIGS. 1-4, 8 and 10) limited to the region between the first base zone 21 and the second base zone 25 with view in extension direction of the electrode fingers 23, 27. Preferably the third thread 33 neither extends over the first base zone 21 nor the second base zone 25. The first contact sites 34 and the second contact sites 35 are exclusively present at the electrode fingers 23 or 27 where the at least one third thread 33 extends over the electrodes 18, 20.

In FIG. 7 an electrical equivalent circuit for a resistance between a first thread 17 and a second thread 19 is schematically illustrated that are connected with one another by exactly one first contact site 34 and exactly one second contact site 35 via one single bridging stitch 36. This resistance is formed by the series circuit of first contact resistance R1, flow resistance R3 and second contact resistance R2. The amounts of all of the individual resistances R1, R3, R2 of this series connection, however, at least the amounts of the two contact resistances R1, R2 are variable depending on the applied force F.

As schematically illustrated in FIG. 6, the application of the force F can be created, for example, by pressing with the tip of a finger 38 on the cover layer 32. The force F thus does not act upon one single bridging stitch 36 of cover layer 32, but on a plurality of bridging stitches 36. In doing so, multiple series connections of a first contact resistance R1, a flow resistance R3 and a second contact resistance R2, as schematically illustrated in FIG. 7, are connected in parallel due to acting upon the multiple bridging stitches 36. Then a total resistance RG between the first connection 22 and the second connection 26 is obtained by the parallel connection of multiple series connections, one of which is schematically illustrated in FIG. 7.

The total resistance RG is also formed by a multiplicity of parallel-connected series connections 39, according to FIG. 7, also without application of an external force F, if without the application of an external force F already an electrically conductive connection between the two electrodes 18, 20 is established via the cover layer 32, the total resistance RG of which can be modified and particularly reduced by application of the force F.

If already without application of an external force F an electrically conductive connection between the two connections 22, 26 is established, the interruption-free condition of the electrical connection can be checked also without the application of an external force F.

Figure 12:
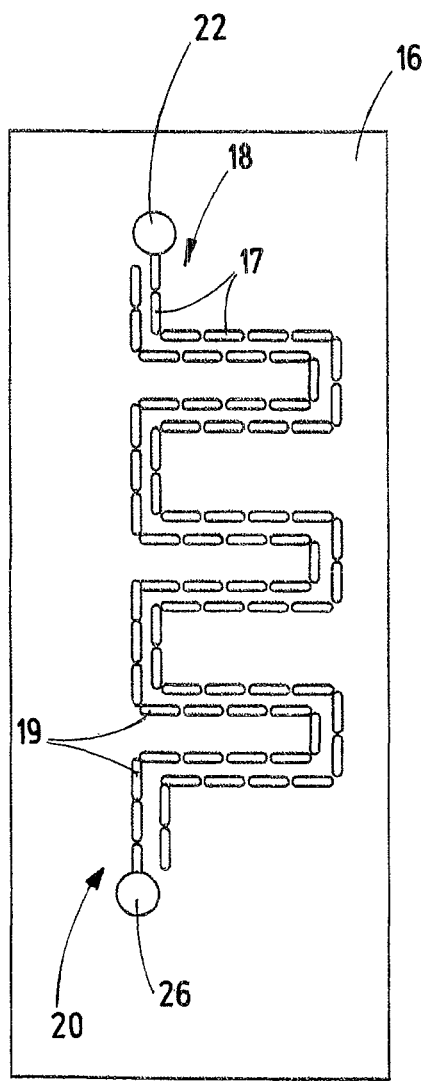
Figure 13:
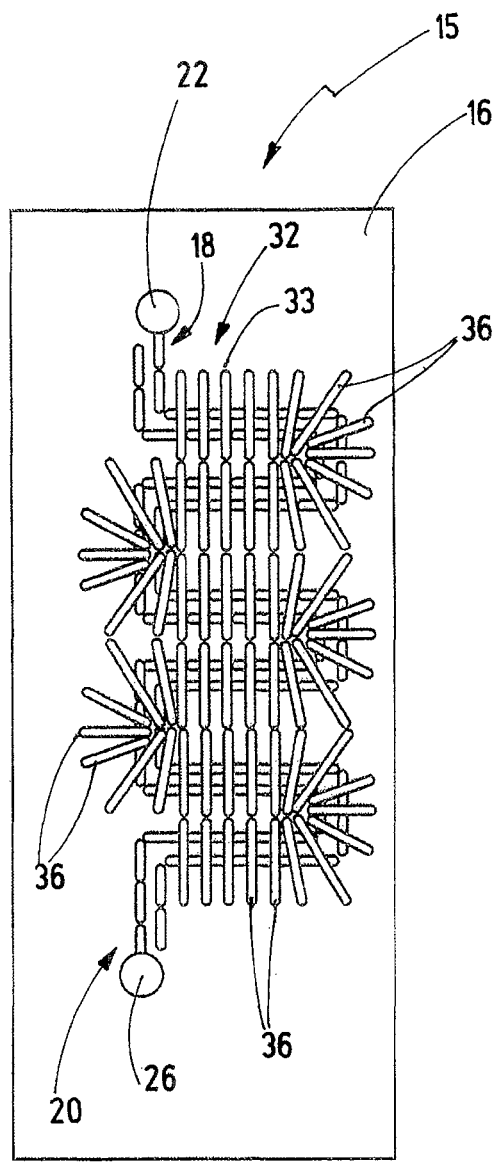

In FIGS. 12 and 13 a further example of the embodiment of a sensor 15 is illustrated, wherein the cover layer 32 has been omitted for improved clarity in FIG. 12 and only electrodes 18, 20 are illustrated. The two electrodes 18, 20 extend with distance approximately parallel to each other at least in a region in which the cover layer 32 is applied on the carrier, in the embodiment in serpentine line or meandering manner. According to the example, due to this meandering extension between two parallel extending sections of first electrode 18 to approximately parallel extending sections of the second electrode 20 are arranged. The exact extension and the shape of electrodes 18, 20 can vary and can, for example, form letters, numbers or symbols. The bridging stitches 36 of cover layer 32 extend over first electrode 18 and second electrode 20 along their extension respectively. In FIG. 13 a cover layer 32 with low density of bridging stitches 36 is schematically shown in order to illustrate the principle of the sensor configuration. The density of bridging stitches 36 can also be higher.

The puncture holes of the bridging stitches 36 of cover layer 32 are in the embodiment illustrated in FIG. 13 arranged adjacent or between two sections of the same electrode 18 or 20. Depending on the shaping of the extension of electrodes 18, 20, sufficient space for a higher or lower stitch density of bridging stitches 36 can be provided. It is preferred, if the distances between the puncture sites of bridging stitches 36 are as low as possible in order to use the surface optimally. The puncture sites of bridging stitches 36 must, however, not damage or unintentionally short-circuit the electrodes 18, 20 arranged underneath.

Due to the meandering shape of electrodes 18, 20, the possibility exists to provide the entire area covered by electrodes 18, 20 with a cover layer 32 and to use it as pressure-sensitive surface. The number of bridging sites per area unit is lower than in the interdigital arrangement described previously, as it is e.g. illustrated in FIGS. 1-4.

Figure 8:
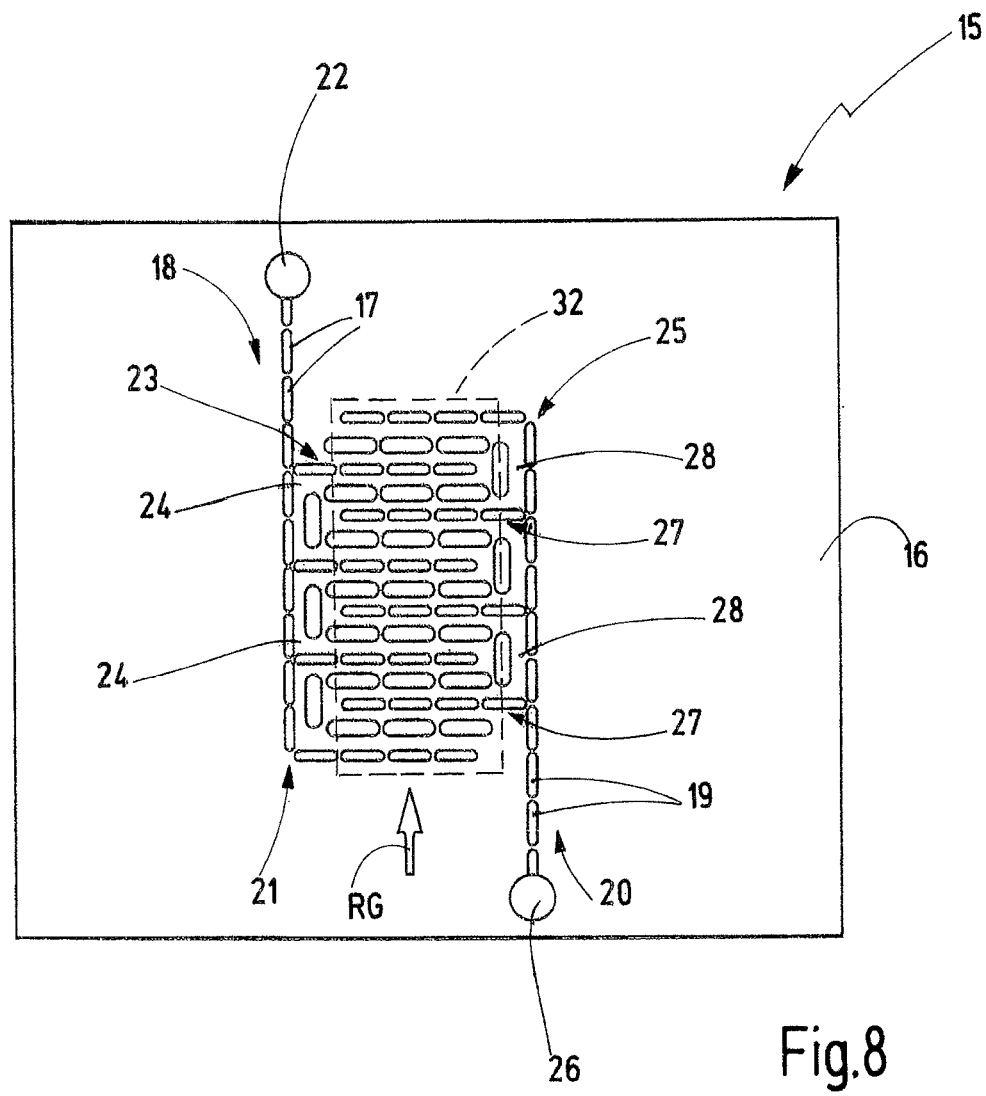
Figure 9:
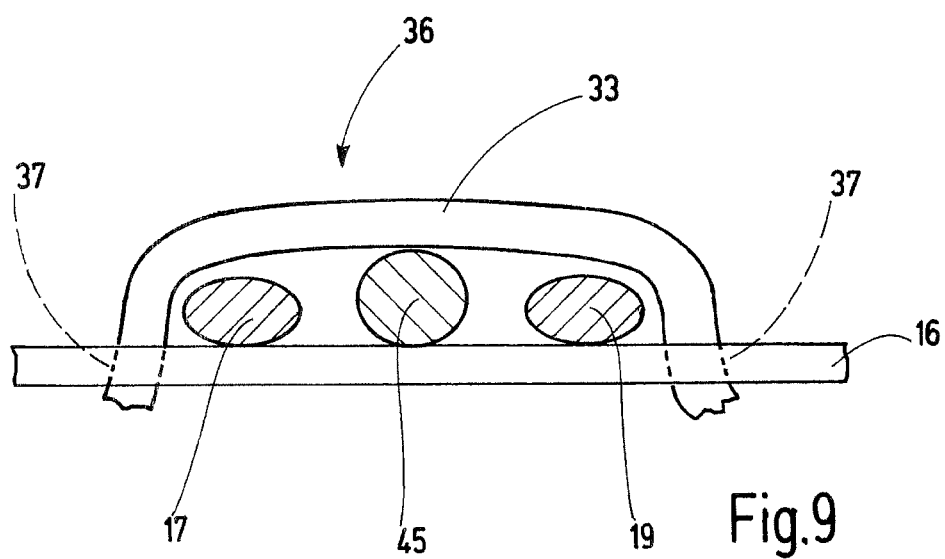

A further configuration possibility of sensor 15 is schematically illustrated in FIGS. 8 and 9 that can be combined with all embodiments of sensor 15. In this embodiment a distance thread 45 is stitched on the carrier 16. The distance thread 45 is located on the carrier 16 on the same side or in the same plane as the first electrode 18 and the second electrode 20. The strength or diameter of the distance thread 45 is larger than the strength or diameter of the at least one first thread 17 and the at least one second thread 19. The distance thread 45 is at least stitched on the carrier 16, where the cover layer 32 is located. Preferably each bridging stitch 36 of cover layer 32 extends over a section of the distance thread 45. Without application of an external force the maximum distance of the third thread 33 of a bridging stitch 36 to the carrier 16 is increased compared with a variation without distance thread 45 and the first contact resistance R1 and the second contact resistance R2 are increased. The first contact resistance R1 and/or the second contact resistance R2 can be increased thereby in a manner, such that no current flow that can be measured occurs between first connection 22 and second connection 26 in case of voltages and currents that are usually used for sensors—the first contact resistance R1 and/or the second contact resistance R2 can be endlessly high, so to speak, as long as no external force is applied, if at the contact sites 34, 35 a distance is present between the third thread 33 and the first thread 17 or the second thread 19 without external force.

It shall be understood that in a case in which multiple threads are used for stitching of electrodes 18, 20 that form a thread bundle, the at least one distance thread 45 or a distance thread bundle of multiple distance threads 45 is used, the total thickness of which is larger than the total thickness of the fiber bundle of first threads 17 or second threads 19.

Figure 10:
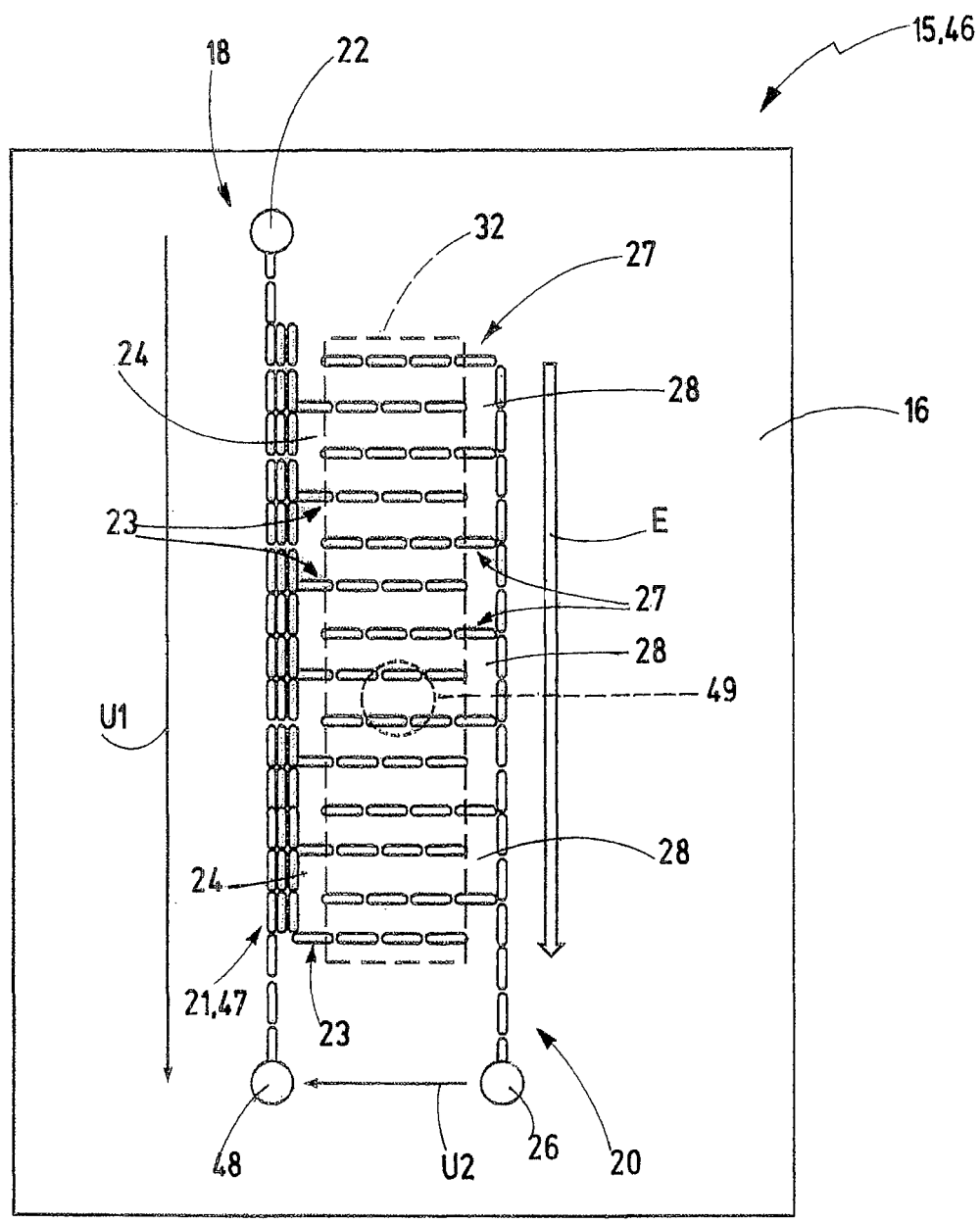

By means of the stitching technique, also a sensor 15 can be manufactured that forms a potentiometer 46 (FIG. 10). In the potentiometer 46 at least one base zone and according to the example, the first base zone 21, is configured as resistance zone 47. The resistance zone 47 has a lower conductivity than the remaining parts of first electrode 18. This can be achieved, e.g. in that the resistance zone 47 is stitched from a thread having a lower conductivity than the thread used for stitching the first electrode fingers 23. At the side opposite the first connection 22 a third connection 48 is electrically connected with the resistance zone 47. Between the first connection 22 and the third connection 48, therefore a maximum potentiometer resistance is formed provided by the resistance zone 47.

As described in connection with the first base zone 21, first electrode fingers 23 extend from the resistance zone 47 at different locations. The second electrode 20 is configured analog to the embodiments described above.

Figure 11:
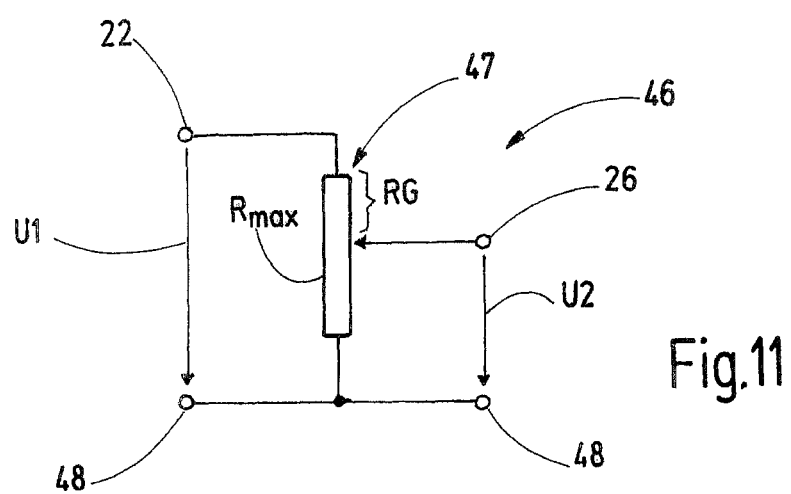

If a force F is applied on the cover layer 32 at an application location 49, an electrical coupling between at least one first electrode finger 23 and at least one second electrode finger 27 occurs. Depending on where the application location 49 is located in extension direction E of resistance zone 47, the variable total resistance RG between first connection 22 and second connection 26 changes. In FIG. 11 an equivalent circuit for the potentiometer 46 of FIG. 10 is illustrated schematically. The total resistance RG is substantially formed by the part of the resistance zone 47 extending between the application location 49 and the first connection 22.

If a first voltage U1 is applied between first connection 22 and third connection 48, a second voltage U2 can be measured between second connection 26 and third connection 48 that depends on the position of the application location 49 in extension direction E. It thereby applies:

$$\frac{U1}{R_{max}} = \frac{U2}{R_{max} - RG}$$

The invention refers to a sensor 15 that is manufactured by stitching with threads 17, 19, 33 on a carrier 16. Due to stitching, a first electrode 18, a second electrode 20 as well as a cover layer 32 are formed. Via cover layer 32 an electrically conductive connection can be established between first electrode 18 and second electrode 20, at least if a force F acts upon cover layer 32 and presses at least a part of cover layer 32 against a part of first electrode 18 and second electrode 20. This force F can be generated by a pressure locally applied on the cover layer 32 and/or by bending of cover layer 32 or carrier 16. The entire sensor 15 and particularly the first electrode 18, second electrode 20 as well as cover layer 32 are exclusively manufactured by stitching on a common carrier 16. The sensor can be manufactured in a particular simple and cheap manner and is robust.

By means of the invention, also sensors 20 can be obtained that are configured in a very flat manner. The material usage for manufacturing of sensor 15 is low and only little waste is created during manufacturing. Due to the selection of the thread or yarn or twisted yarn for the first thread and/or second thread and/or third thread, the measurement range and measurement sensitivity of sensor 15 can be selected. The measurement range and the measurement sensitivity can vary due to the arrangement of electrodes 18, 20 and/or the bridging stitches 36 of cover layer 32. Instead of the interdigital arrangement of electrodes 18, 20 that is illustrated according to the example, also other arbitrary shapes for forming the electrodes 18, 20 are possible. For example, electrode fingers 23, 27 can also have at least one curved and/or bent location. The base zones 21, 25 do not necessarily have to extend along a straight line, but can also comprise at least one curved and/or at least one bent location. The base zones 21, 25 can also surround or cover an area, e.g. a circular or polygonal area. The inventive sensor can also be produced with one or multiple additional stitched sensors in a common process on a sewing machine or a stitching machine, e.g. with another sensor according to the invention or a humidity sensor. The sensor according to the invention can be combined during stitching also with other stitched electrical functional areas, such as supply lines and/or heating devices.

LIST OF REFERENCE SIGNS 15 sensor
16 carrier
17 first thread
18 first electrode
19 second thread
20 second electrode
21 first base zone
22 first connection
23 first electrode finger
24 first interstice
25 second base zone
26 second connection
27 second electrode finger
28 second interstice 32 cover layer
33 third thread
34 first contact site
35 second contact site
36 bridging stitch
37 puncture site
38 finger
39 series connection
45 distance thread
46 potentiometer
47 resistance zone
48 third connection
a first distance
b second distance
E extension direction of resistance zone
F force
R1 first contact resistance
R2 second contact resistance
R3 flow resistance
RG total resistance
$R_{max}$ maximum potentiometer

The invention claimed is:

1. A sensor configured to detect and/or measure a force applied on the sensor, wherein the sensor comprises:
   a carrier;
   a first electrode that is formed by at least one first thread that is stitched on the carrier and that comprises electrically conductive components;
   a second electrode that is formed by at least one second thread that is stitched on the carrier and that comprises electrically conductive components, wherein the first electrode and the second electrode are arranged with distance to one another on the carrier; and
   a cover layer that is formed by at least one third thread that is stitched on the carrier and that comprises electrically conductive components, wherein the at least one third thread of the cover layer is in abutment with the at least one first thread of first electrode and the at least one second thread of second electrode at multiple contact sites, wherein the first electrode has a first base zone and multiple first electrode fingers extending away from the first base zone, wherein a first interstice is formed between two directly adjacent first electrode fingers of the multiple first electrode fingers respectively, and wherein the second electrode comprises a second base zone and multiple second electrode fingers extending away from the second base zone, wherein a second interstice is formed between two directly adjacent second electrode fingers of the multiple second electrode fingers respectively.

2. The sensor according to claim 1, wherein at least one distance element is present on the carrier and/or at the carrier adjacent to the first electrode and the second electrode that defines a distance between the carrier and the cover layer.

3. The sensor according to claim 2, wherein the at least one distance element is realized by a distance thread that is sewn or stitched on the carrier.

4. The sensor according to claim 1, wherein the sensor comprises a total resistance between a first connection of the first electrode and a second connection of the second electrode, an amount of the total resistance depends on a force acting on the cover layer.

5. The sensor according to claim 4, wherein the total resistance depends on a first contact resistance between the at least one first thread of the first electrode and the at least one third thread of the cover layer and on a second contact resistance between the at least one second thread of the second electrode and the at least one third thread of the cover layer.

6. The sensor according to claim 4, wherein the total resistance depends on a flow resistance of the at least one third thread, the flow resistance depends on a force acting on the at least one third thread of the cover layer.

7. The sensor according to claim 1, wherein the first electrode and the second electrode extend parallel to one another with a predefined distance next to each other at least in a region.

8. The sensor according to claim 1, wherein at least one second electrode finger of the multiple second electrode fingers extends into the first interstice and wherein at least one first electrode finger of the multiple first electrode fingers extends into the second interstice.

9. The sensor according to claim 1, wherein multiple puncture sites of the stitched cover layer where the at least one third thread penetrates the carrier are arranged in the first interstice and/or the second interstice.

10. The sensor according to claim 9, wherein the at least one third thread of the cover layer comprises multiple bridging stitches that extend over a first electrode finger of the multiple first electrode fingers and a second electrode finger of the multiple second electrode fingers respectively.

11. The sensor according to claim 10, wherein some of the multiple bridging stitches that extend over the first electrode finger of the multiple first electrode fingers extends over one of two directly adjacent second electrode fingers of the multiple second electrode fingers and other of the multiple bridging stitches that extend over the first electrode finger of the multiple first electrode fingers extend over the other of the two directly adjacent second electrode fingers of the multiple second electrode fingers.

12. The sensor according to claim 1, wherein the at least one third thread of the cover layer extends over the at least one first thread and the at least one second thread at least predominantly at at least one first electrode finger of the multiple first electrode fingers and at at least one second electrode finger of the multiple second electrode fingers.

13. A sensor configured to detect and/or measure a force applied on the sensor, wherein the sensor comprises:
   a carrier;
   a first electrode that is formed by at least one first thread that is stitched on the carrier and that comprises electrically conductive components;
   a second electrode that is formed by at least one second thread that is stitched on the carrier and that comprises electrically conductive components, wherein the first electrode and the second electrode are arranged with distance to one another on the carrier; and
   a cover layer that is formed by at least one third thread that is stitched on the carrier and that comprises electrically conductive components, wherein the at least one third thread of the cover layer is in abutment with the at least one first thread of first electrode and the at least one second thread of second electrode at multiple contact sites, wherein the sensor is configured as potentiometer.

14. The sensor according to claim 13 wherein the first electrode has a first base zone and multiple first electrode fingers extending away from the first base zone, wherein a first interstice is formed between two directly adjacent first electrode fingers of the multiple first electrode fingers respectively, and wherein the second electrode comprises a second base zone and multiple second electrode fingers extending away from the second base zone, wherein a second interstice is formed between two directly adjacent second electrode fingers of the multiple second electrode fingers respectively and wherein the first base zone of the first electrode or the second base zone of the second electrode forms a resistance zone and that the sensor comprises a total resistance between a first connection of the first electrode and a second connection of the second electrode, wherein the total resistance changes depending on a location where a force acts on the cover layer.

15. The sensor according to claim 3, wherein the sensor comprises a total resistance between a first connection of the first electrode and a second connection of the second electrode, an amount of the total resistance depends on a force acting on the cover layer.

16. The sensor according to claim 15, wherein the total resistance depends on a first contact resistance between the at least one first thread of the first electrode and the at least one third thread of the cover layer and on a second contact resistance between the at least one second thread of the second electrode and the at least one third thread of the cover layer.

17. The sensor according to claim 16, wherein the total resistance depends on a flow resistance of the at least one third thread, the flow resistance depends on a force acting on the at least one third thread of the cover layer.

18. The sensor according to claim 17, wherein the first electrode and the second electrode extend parallel to one another with a predefined distance next to each other at least in a region.

19. The sensor according to claim 18, wherein the first electrode has a first base zone and multiple first electrode fingers extending away from the first base zone, wherein a first interstice is formed between two directly adjacent first electrode fingers of the multiple first electrode fingers respectively, and wherein the second electrode comprises a second base zone and multiple second electrode fingers extending away from the second base zone, wherein a second interstice is formed between two directly adjacent second electrode fingers of the multiple second electrode fingers respectively.

20. The sensor according to claim 1, wherein the sensor is configured as potentiometer.

* * * * *